(Model.)
A. S. HARRIS.
AUTOMATIC FIRE EXTINGUISHER.
No. 248,038. Patented Oct. 11, 1881.
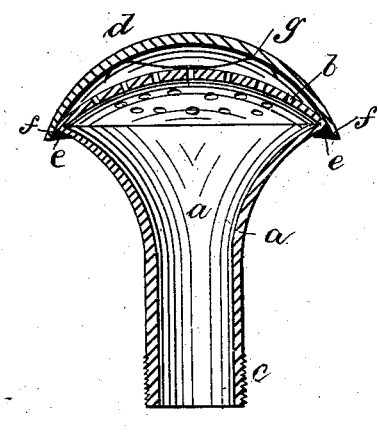
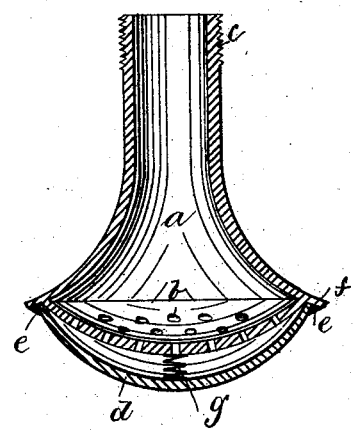
Witnesses.
D. F. Connor.
B. J. Noyes.
Inventor.
Alphonso S. Harris
by Crosby & Gregory
Attys.

United States Patent Office.

ALPHONSO S. HARRIS, OF CHELSEA, MASSACHUSETTS.

AUTOMATIC FIRE-EXTINGUISHER.

SPECIFICATION forming part of Letters Patent No. 248,038, dated October 11, 1881.

Application filed July 2, 1881. (Model.)

*To all whom it may concern:*

Be it known that I, ALPHONSO S. HARRIS, of Chelsea, Suffolk county, State of Massachusetts, have invented an Improvement in Automatic Fire-Extinguishers, of which the following description, in connection with the accompanying drawings, is a specification.

This invention relates to automatic fire-extinguishers of that class in which a sprinkling-nozzle or distributer connected with a water-pipe is sealed by a cover or inclosing-cap fastened thereon by solder fusible at low temperature, so that when a fire breaks out the said solder is melted and releases the said cover to permit the water to flow and extinguish the fire.

The present invention has for its object to render the apparatus more delicate or sensitive to the action of heat, so that the water will be released in less time after the breaking out of the fire than is usual in apparatus of this kind.

In all the devices of this class heretofore in use, so far as I am aware, the solder has been placed as a film between the surfaces of the two metallic portions—viz., the distributer and cover that it is intended to unite—and is not consequently exposed to the direct action of the rays of heat or of heated currents of air passing over the distributer, but the heat has to be conducted through the inclosing metal united by the solder before reaching and affecting the solder.

In the present invention the solder by which the sealing-cap is fastened to the distributer is upon the outside of the metal of the said cap and distributer, and so arranged as to be directly exposed to the action of rising heated currents of, and to the rays of, heat. One of the said metal portions, either the cover or distributer, is made to extend beyond or jut over the other, and is somewhat inclined thereto, thus forming a shallow channel, in which the solder is run without being inclosed by the said metal portions. I have also provided a spring between the said cover and distributer to throw the cover off as soon as the solder is softened by the action of the heat.

Figure 1 shows, in longitudinal section, an automatic extinguishing device constructed according to my invention, of the form used when the distributer is to extend upward from the water-pipe; and Fig. 2, a similar view of a distributer arranged to be placed beneath and extending downward from the water-pipe.

The distributer *a* may be of any suitable or usual form, it being provided with perforations *b* for the distribution of the water, and screw-threaded at *c*, or otherwise adapted to be attached to the water-supply pipe. A cover, *d*, for the perforated part of the distributer, is fastened thereto by a fusible solder, *e*, forming a complete and impervious connection between the said distributer and cover.

When the distributer is to be used in an upright position, as shown in Fig. 1, the cover *b* is made somewhat larger than the portion of the distributer that it is connected with to form an overhanging rim, *f*, and the surfaces of the distributer *a* and cover *d* are preferably of such form, or meet at such an angle that a shallow channel is left between the distributer and the overhanging rim to be filled with the solder *e*, as shown, the said solder being thus completely uncovered at its lower surface and exposed to the action of the rising currents of heated air, to rays of heat from a fire at any point below it, the said distributer being always placed in the upper part of the space to be protected and above the action of the fire.

When the distributers are intended to extend downward, as shown in Fig. 2, the overhanging rim *f* is made upon the body of the distributer, so that the solder will still be exposed to the action of the rising currents of air or rays from a fire below it.

A spring, *g*, of which different forms are shown in the two figures, is placed between the distributer *a* and cover *d* to assist the water in forcing off the cover as soon as the solder *e* has been sufficiently softened by the heat. By having the solder thus uncovered and directly exposed it is much more quickly affected than when inclosed between the metal portions of the cover and distributer and affected only by heat conducted therethrough in the usual manner.

I claim—

1. In an automatic fire-extinguisher, the distributer provided with openings for the passage of water and the cover therefor, one of the said portions being provided with an overhanging rim jutting beyond the edge of the other, combined with fusible solder lying on the said rim to connect the distributer and cover together and seal the joint between them, the said solder lying wholly upon the outer surface of the metal connected by it and exposed to the direct action of heat rays or air-currents, substantially as and for the purpose described.

2. The perforated distributer and cover sealed thereon by fusible solder, combined with the detaching-spring between the said cover and distributer to detach forcibly and throw off the said cover as soon as the solder is softened, substantially as described.

3. The perforated distributer and cover therefor, the surfaces of the said parts being slightly inclined to one another at their line of contact, and one overhanging the other to produce a shallow channel, as described, combined with the fusible solder lying in the said channel to unite and seal the said distributer and cover, and being exposed to the direct action of heat, substantially as described.

In testimony whereof I have signed my name to this specification in the presence of two subscribing witnesses.

ALPHONSO S. HARRIS.

Witnesses:
JOS. P. LIVERMORE,
B. J. NOYES.